Feb. 3, 1970 A. C. GRANTHAM 3,492,834
SEAL MEANS FOR REFRIGERATION SYSTEMS
Filed June 21, 1968

INVENTOR.
ARTHUR C. GRANTHAM.
BY B. H. Claeboe
ATTORNEY.

United States Patent Office 3,492,834
Patented Feb. 3, 1970

3,492,834
SEAL MEANS FOR REFRIGERATION SYSTEMS
Arthur C. Grantham, 31 Penguin Terrace,
Cortland, N.Y. 13045
Filed June 21, 1968, Ser. No. 738,891
Int. Cl. F25d *19/00*
U.S. Cl. 62—299                     3 Claims

ABSTRACT OF THE DISCLOSURE

A refrigeration system wherein intermediate the evaporator and condenser pressure switch means are provided embodying a supporting structure formed of mating parts which feature therebetween seal means constructed to assure correct alignment of the seal means with respect to the mating parts regardless of the particular positioning of the later.

BACKGROUND OF THE INVENTION

It is known in the art to mount pressure switch means in a refrigeration system upon a support which includes a sleeve member and a threadably associated fitting wherein the seal therebetween is effected by a generally dish-shaped gasket. However, since assembly of these parts must necessarily be effected in production with rapidity, frequently the gasket or seal is improrperly seated and leakage between the mating parts accordingly often results.

These problems of the prior art structure described are herein avoided by equipping the gasket or seal means with an extended guide portion, which may of course take various forms, exemplified herein by a tubular portion or ferrule integral with a flared collar portion, or a flared gasket or seal member stamped or otherwise formed to provide protruding semi-arcuately shaped tabs. In this manner, the seal means may be readily inserted between the mating parts in correct alignment therewith, the installation is accordingly markedly facilitated, assurance of an effective seal is accomplished, and the manufacturing costs of the novel seal means of this invention do not depart markedly from the prior art structures.

SUMMARY OF THE INVENTION

The present invention is directed to a seal member for positioning between a threaded sleeve associated with a mating fitting wherein between the sleeve and fitting there is locaed a seal member desirably taking the form of a flared collar portion and integral ferrule, the collar portion when the parts are assembled being clamped between the sleeve and fitting, while the ferrule portion seats upon the upper end of the fitting. As indicated earlier, the seal member may be formed in various other ways, and an exemplary alternate arrangement is to stamp the seal member in such a manner as to provide a plurality of opposed dependent tabs which seat upon the fitting and perform in an effective manner the same guiding function of the ferrule. Of course, guide means as a part of the seal member may be formed in other ways.

DESCRIPTION OF THE PREFERRRED EMBODIMENT

Figure 1:
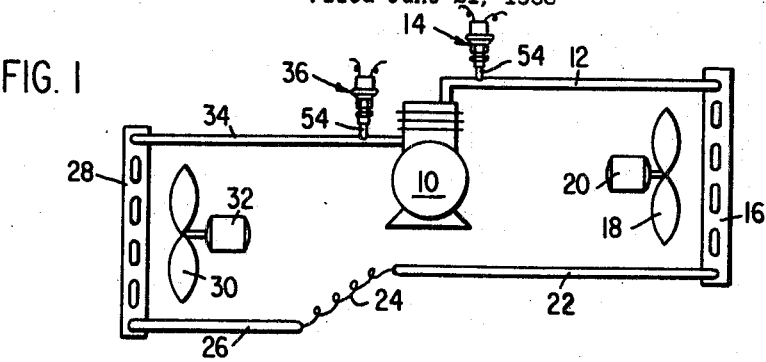
FIGURE 1 is a schematic portrayal of a typical refrigeration system wherein the present invention may be utilized.

Referring now to the drawings, and first to the schematic portrayal of FIGURE 1, a typical refrigeration system comprises a compressor 10 which discharges relatively hot gaseous refrigerant through conduit 12 having communication with high pressure switch means or refrigerant coupling means 14 to condenser 16 over which ambient air is caused to flow by fan 18 actuated by motor 20. The condensed liquid refrigerant passes from the condenser 16 through conduit 22 into expansion means 24 and therefrom into conduit 26 to evaporator 28 over which air is passed by fan 30 under control of motor means 32. Vaporous refrigerant then flows through line 34 having communication with low pressure switch means or refrigerant coupling means 36 back to the compressor 10 to complete the refrigerant flow cycle.

The switch means 14 and 16 may be essentially identical in the structural details thereof, and desirably include in the switch portion thereof a body section 38 with connecting leads 39a and 39b, the body section being mounted upon a base section 40 soldered or otherwise secured to support means generally designated by the numeral 42, which support means incorporates therein the novel concepts of the present invention.

Figure 2:
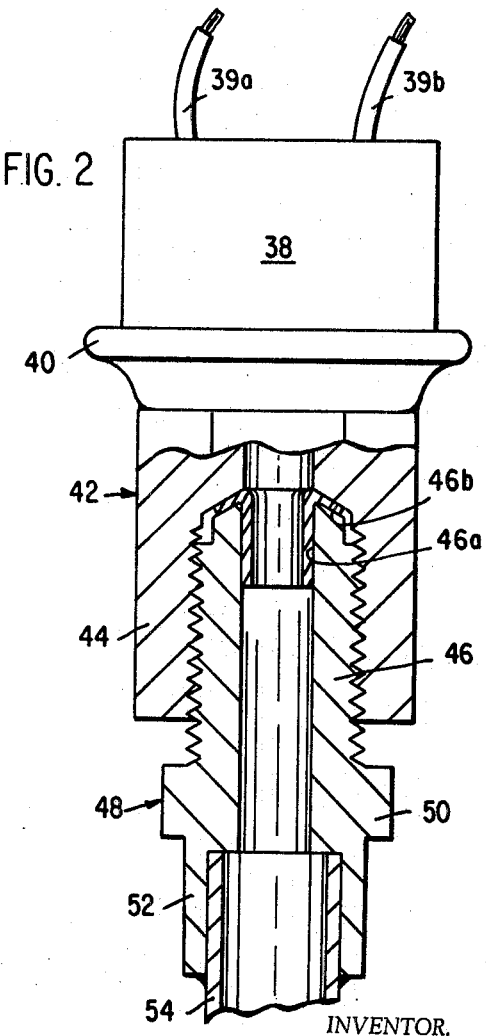
FIGURE 2 is an elevational view, with parts thereof taken in section, showing an illustrative embodiment of the seal member of this invention.

The support means shown in FIGURE 2 includes an internally threaded sleeve member 44 which receives therein nipple portion 46 of a fitting designated in its entirety by the numeral 48. The fitting 48, in addition to the externally threaded nipple portion 46, is equipped with a nut or tool engaging portion 50 intermediate the nipple portion 46 and a tubular section 52 to which is secured by soldering techniques or like methods a tubular member 54 affixed to and communicating with the conduits 12 and 34.

Figure 5:
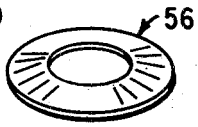
FIGURE 5 is a perspective view of a typical prior art gasket or seal member.

Following the teachings of the prior art, it has been conventional to interpose between the niple 46 and sleeve 44 a gasket or seal member 56 generally taking the form illustrated in FIGURE 5. As is shown therein, the prior art gasket is flared or tapered, however, in order to effect rapid production assembly of the nipple, sleeve, and gasket, in most instances it has been found that the gasket becomes misaligned or canted with respect to the rounded or beveled end of the nipple. As a result, improper sealing between the mating parts occurs, with consequent fluid leakage.

Figure 3:
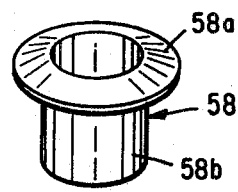
FIGURE 3 and 4 are perspective views of seal means incorporating the novel concepts of this invention.

In a refrigeration system of the character generally described hereinabove, incorrect seating of the gasket and resultant fluid escapement thereabout is effectively prevented by constructing the seal member with the exemplary design features which appear in FIGURES 2, 3 and 4. A preferred structure is shown in the first two views and essentially comprises a flared or downwardly dished collar portion 58a integrally formed with a dependent tubular portion or ferrule 58b to provide in its entirety a seal member 58. The tubular portion 58b of the seal member is externally sized to make slidable and desirably relatively close fitting contact with the inner diameter of passage 46a extending axially through the nipple member 46, and the collar or head portion 58a is contoured and sized such that when the nipple 46 is threadably assembled with the sleeve 44, the underside of the collar of the seal member 58 circumferentially engages and accurately seats upon beveled portion 46b of the nipple member 46. There is accordingly provided intimate metal to metal contact throughout and fluid leakage is effectively prevented. Naturally, in any of the embodiments of this invention, plastics may be substituted for metal seal members.

Figure 4:
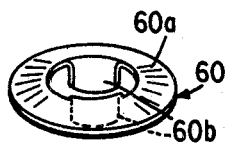

Advantageous results are also achieved by constructing the guide portion of the seal member in a different manner, and an illustrative variation is portrayed in FIGURE 4. Stamping techniques may also be employed in this embodiment, to provide a seal member or gasket means 60 having a dished head or collar portion 60a from which are formed semi-arcuately diametrally opposed tabs 60b of sufficient length to perform a guiding function in the manner of the ferrule or tubular portion 58b of the seal member 68 shown in FIGURE 3. The seal member 60 is clamped between the nipple and sleeve members of the fitting 42 much like the illustrative structure of FIGURES 2 and 3, and is equally effective in accomplishing ready seating and production of an effective seal between the parts associated therewith.

Without departure from the novel concepts of this invention or the scope of the subjoined claims, numerous modifications and variations in the structures herein disclosed may of course be practiced.

I claim:
1. In a refrigeration system having a condenser, compressor, evaporator, and conduit means leading therebetween, the improvement which comprises refrigerant coupling means communicating with said conduit means and including passaged male and female members threadably associated in telescoping interfitting relation and seal means interposed between said members in intimate contact therewith, said seal means having a flared collar portion seated upon said male member and bearing against said female member and integral dependent guide portion received in said male member, whereby upon assembly proper seating of said seal means between said members is effected and fluid leakage eliminated.

2. A refrigeration system of the character defined in claim 1, in which the guide portion integral with the collar portion is a ferrule.

3. A refrigeration system as defined in claim 1, wherein the guide portion integral with the collar portion comprises a plurality of semi-arcuately shaped dependent tabs.

References Cited
UNITED STATES PATENTS

| | | | |
|---|---|---|---|
| 714,726 | 12/1902 | Marsh | 285—332.3 |
| 954,549 | 4/1910 | Turner | 285—332.3 |
| 1,133,320 | 3/1915 | Rockwood | 285—332.3 |
| 1,703,311 | 2/1929 | Little | 62—299 |
| 2,518,299 | 8/1950 | Fernandez | 62—299 |
| 2,523,578 | 9/1950 | Lewis | 285—332.2 |
| 3,066,497 | 12/1962 | Dubberley | 62—299 |

WILLIAM J. WYE, Primary Examiner

U.S. Cl. X.R.
285—332.3